(No Model.)
G. W. McDANNOLD.
LIFTING FORK.
No. 256,719. Patented Apr. 18, 1882.
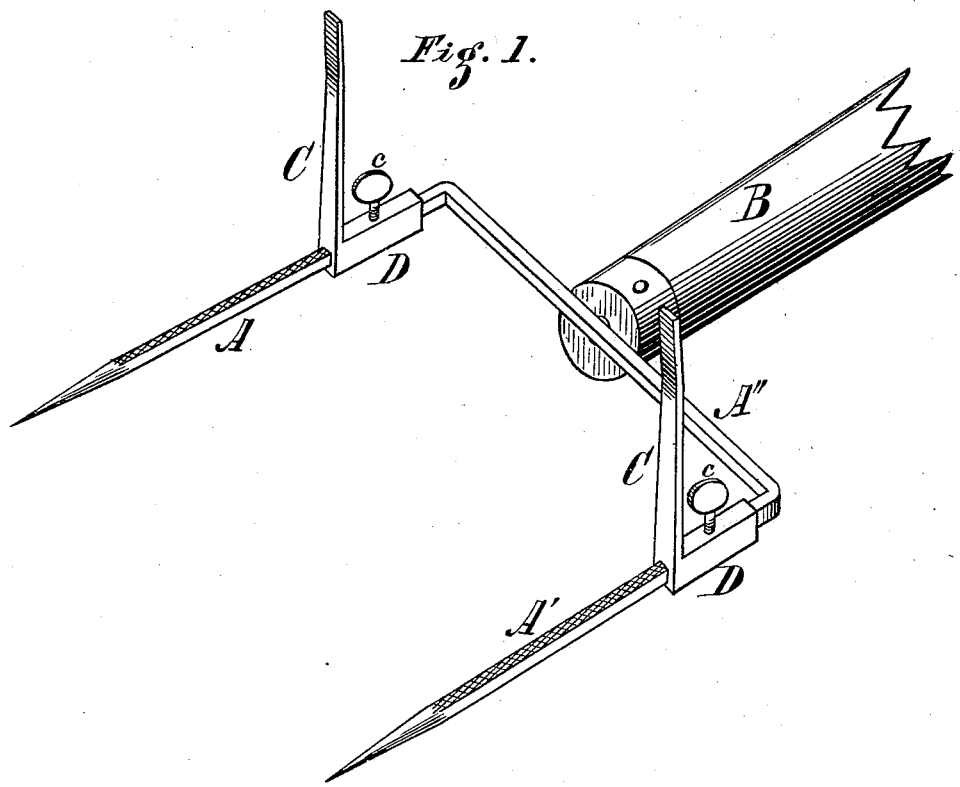
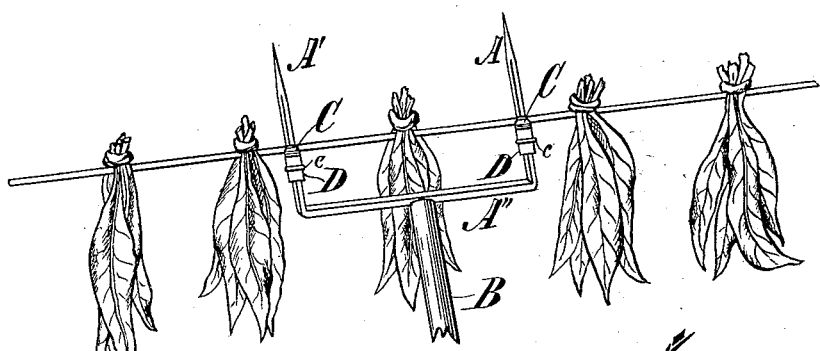
Attest,
Jno. E. Wiles,
Herbert P. Cook.
Inventor,
George W. McDannold
by Wood & Boyd
his Attorneys.

UNITED STATES PATENT OFFICE.

GEORGE W. McDANNOLD, OF KENTON, KENTUCKY.

LIFTING-FORK.

SPECIFICATION forming part of Letters Patent No. 256,719, dated April 18, 1882.

Application filed February 20, 1882. (No model.)

*To all whom it may concern:*

Be it known that I, GEORGE W. McDANNOLD, a citizen of the United States, and a resident of Kenton, in the county of Kenton and State of Kentucky, have invented certain new and useful Improvements in Lifting-Forks, of which the following is a specification.

My invention relates to a two-prong lifting-fork, and it is especially adapted for lifting articles which are suspended on a stick or cross-rods—such as tobacco, &c.—which are usually cured and handled by being suspended upon bars resting in brackets attached to the sides or roofs of buildings. The usual method of hanging tobacco is to employ scaffolds arranged around the building, one above the other and considerable distance apart, to reach several tiers from different scaffolds.

My invention enables the tobacco strung upon the bars to be raised to its resting-place and lowered therefrom by means of the lifter and its handle, dispensing with much of the scaffolding hitherto employed, and at the same time dispensing with considerable manual labor and cheapening the cost of the material employed, all of which will be fully set forth in the description of the following drawings.

Figure 1 is a perspective view of my device. Fig. 2 represents the device in use.

A A' represent the prongs of my lifting-fork. They are made straight instead of being curved, as usual.

A² represents the cross-head, which is preferably made integral with the prongs. It is provided with a shank by which it is secured into a handle. Any other equivalent means for securing the fork to the handle may be employed.

In order to hold the article to be lifted, I employ guards C, which are attached to each tine of the fork by means of the socket D and the set-screw c, so as to be adjustable to or from the ends of the tines. This adjustment enables the end of the tines to be changed, so as to accommodate it to the varying sizes of bundles, or to the character of work for which it is employed. The upper surface of the tines is roughened for two purposes: first, it facilitates the engagement of the set-screw to hold the guard in place, and also to prevent the lateral movement of the stick or articles suspended on the tines. The guards C are curved or projected toward the ends of the tines, so as to prevent the bar, which when elevated is supported upon the guards, from slipping off backward.

It is obvious that three tines or more may be employed, but two will answer the purpose.

By making the tines square the guards are kept from turning without the aid of set-screws, and the articles are more easily kept in balance.

I claim—

A lifting-fork composed substantially of tines A A', and adjustable guards C D, attached to the handle B, as and for the purpose herein set forth.

In testimony whereof I have hereunto set my hand in the presence of two subscribing witnesses.

GEORGE W. McDANNOLD.

Witnesses:
 JOHN Z. BRUCE,
 HERBERT P. COOK.